United States Patent
Choi et al.

(10) Patent No.: US 12,431,562 B2
(45) Date of Patent: Sep. 30, 2025

(54) APPARATUS AND METHOD FOR SEALING SECONDARY BATTERY

(71) Applicant: LG Energy Solution, Ltd., Seoul (KR)

(72) Inventors: Seong Won Choi, Daejeon (KR); Su Taek Jung, Daejeon (KR); Soon Kwan Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 610 days.

(21) Appl. No.: 17/796,791

(22) PCT Filed: Mar. 9, 2021

(86) PCT No.: PCT/KR2021/002878
§ 371 (c)(1),
(2) Date: Aug. 1, 2022

(87) PCT Pub. No.: WO2021/187790
PCT Pub. Date: Sep. 23, 2021

(65) Prior Publication Data
US 2023/0053218 A1     Feb. 16, 2023

(30) Foreign Application Priority Data

Mar. 16, 2020  (KR) ........................ 10-2020-0032235

(51) Int. Cl.
*H01M 50/105*   (2021.01)
*H01M 50/184*   (2021.01)
*H01M 50/186*   (2021.01)

(52) U.S. Cl.
CPC ....... *H01M 50/105* (2021.01); *H01M 50/184* (2021.01); *H01M 50/186* (2021.01)

(58) Field of Classification Search
CPC ............ H01M 50/105; H01M 50/186; H01M 50/184; H01M 50/183
(Continued)

(56) References Cited

U.S. PATENT DOCUMENTS

| 2015/0202647 A1 | 7/2015 | Watanabe et al. |
| 2017/0282204 A1 | 10/2017 | Watanabe et al. |

(Continued)

FOREIGN PATENT DOCUMENTS

| CN | 205770460 U | 12/2016 |
| CN | 109689365 A | 4/2019 |

(Continued)

OTHER PUBLICATIONS

International Search Report for PCT/KR2021/002878 dated Jun. 15, 2021. 3 pgs.
(Continued)

*Primary Examiner* — Allison Bourke
*Assistant Examiner* — Robert Gene West
(74) *Attorney, Agent, or Firm* — Lerner David LLP

(57) ABSTRACT

The present invention relates an apparatus for sealing a secondary battery, which seals a pouch. The apparatus for sealing the secondary battery comprises: a support block configured to support a bottom surface of one-side sealing part of the pouch; a sealing member comprising a sealing roller that moves in a longitudinal direction of the one-side sealing part in a state of pressing a top surface of the one-side sealing part supported on the support block to seal the one-side sealing part supported on the support block; and a straightening member configured to flatten a surface of the one-side sealing part on which the sealing roller passes.

14 Claims, 14 Drawing Sheets

(58) Field of Classification Search
USPC .......................................................... 429/163
See application file for complete search history.

(56) References Cited

U.S. PATENT DOCUMENTS

2018/0090780 A1   3/2018   Kim et al.
2019/0207172 A1   7/2019   Kim et al.

FOREIGN PATENT DOCUMENTS

| KR | 20060103596 A |   | 10/2006 |
|----|---------------|---|---------|
| KR | 20080007696 A |   | 1/2008  |
| KR | 20110039011 A |   | 4/2011  |
| KR | 20150045097 A |   | 4/2015  |
| KR | 20160019150 A |   | 2/2016  |
| KR | 20160077880 A |   | 7/2016  |
| KR | 20170026230 A |   | 3/2017  |
| KR | 20170033588 A |   | 3/2017  |
| KR | 20170053011 A |   | 5/2017  |
| KR | 20170120444 A |   | 10/2017 |
| KR | 20180010563 A |   | 1/2018  |
| KR | 20180093598 A | * | 8/2018  |
| KR | 20190048863 A |   | 5/2019  |
| WO | 2014025004 A1 |   | 2/2014  |

OTHER PUBLICATIONS

Extended European Search Report for Application No. 21771301.5 dated Mar. 20, 23. 9 pgs.

\* cited by examiner

APPARATUS AND METHOD FOR SEALING SECONDARY BATTERY

CROSS-REFERENCE TO RELATED APPLICATION

The present application is a national phase entry under 35 U.S.C. § 371 of International Application No. PCT/KR2021/002878, filed on Mar. 9, 2021, which claims priority to Korean Patent Application No. 10-2020-0032235, filed on Mar. 16, 2020, the entire contents of which are hereby incorporated by reference herein in their entireties.

TECHNICAL FIELD

The present invention relates to an apparatus and method for sealing a secondary battery, and more particularly, to an apparatus and method for sealing a secondary battery, which are capable of improving sealing quality of a pouch sealing part.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can-type secondary battery, in which an electrode assembly is embedded in a metal can, and a pouch-type secondary battery in which an electrode assembly is embedded in a pouch.

Such a pouch-type secondary battery comprises an electrode assembly, an electrode lead coupled to the electrode assembly, and a pouch accommodating the electrode assembly in a state in which a front end of the electrode lead is drawn out. Also, the electrode assembly has a structure in which electrodes and separators are alternately stacked, and the pouch comprises an accommodation part accommodating the electrode assembly and a sealing part sealing the accommodation part to be sealed.

Here, in the pouch-type secondary battery, when a pouch is manufactured, there is a problem in that creases or wrinkles occur to deteriorate sealing quality when a sealing part of the pouch, in which the creases or wrinkles occur, is sealed, thereby increasing in defect rate.

DISCLOSURE OF THE INVENTION

Technical Problem

The present invention has been invented to solve the above problem, and an object of the present invention is to provide an apparatus and method for sealing a secondary battery, which are capable of improving sealing quality of a sealing part by flattening creases or wrinkles, which occur on the sealing part of a pouch, thereby reducing a defect rate.

Technical Solution

The present invention relates an apparatus for sealing a secondary battery, which seals a pouch, the apparatus comprising: a support block configured to support a bottom surface of one-side sealing part of the pouch; a sealing member comprising a sealing roller that moves in a longitudinal direction of the one-side sealing part in a state of pressing a top surface of the one-side sealing part supported on the support block to seal the one-side sealing part supported on the support block; and a straightening member configured to flatten a surface of the one-side sealing part on which the sealing roller passes.

The support block may be in close contact with the surface of the one-side sealing part from one end to the other end in the longitudinal direction of the one-side sealing part to support a bottom surface of the one-side sealing part.

The straightening member may comprise: a pair of straightening blocks, which are respectively provided on both sides of the support block to support a bottom surface of the one-side sealing part disposed at each of both sides of the support block; and a pair of straightening rollers, which move in the longitudinal direction of the one-side sealing part in a state of pressing a top surface of the one-side sealing part supported by each of the straightening blocks so as to be disposed between the pair of straightening blocks, thereby flattening the surface of the one-side sealing part on which the sealing roller passes.

A rotation center point of each of the pair of straightening rollers when viewed at a position that is spaced apart from the one-side sealing part in a width direction may be disposed at a position spaced a set distance forward from a rotation center point of the sealing roller.

The set distance may range of 5 mm to 20 mm.

The pair of straightening rollers and the sealing roller may have the same diameter and the same rotational force.

The pair of straightening rollers and the sealing roller may be coupled to be interlocked with each other.

A pressing groove may be formed in a top surface of the straightening block in the longitudinal direction of the one-side sealing part, a pressing protrusion forcibly pressing the one-side sealing part disposed in the pressing groove to be inserted into the pressing groove may be formed on a circumferential surface of the straightening roller, and the one-side sealing part that is forcibly inserted into the pressing groove by the pressing protrusion may be pulled in a direction of the straightening roller to flatten the surface of the one-side sealing part on which the sealing roller passes.

Each of the sealing roller and the support block may have a set temperature to thermally fuse the one-side sealing part.

The apparatus may further comprise a guide means configured to guide the sealing roller to move from one end to the other end of the support block.

The guide means may comprise a guide piece in which a guide hole is formed from one end to the other end of one surface of the support block and a guide protrusion having one end that is freely rotatably coupled to a rotation shaft of the sealing roller and the other end that is movably coupled to the guide hole to guide the sealing roller from one end to the other end of the support block.

A method for sealing a secondary battery, which is performed to seal a pouch, in which an electrode assembly is accommodated, comprises: a support block disposition step (S10) of disposing a support block on a bottom surface of one-side sealing part of the pouch, wherein the support block is disposed to be supported in a longitudinal direction of the one-side sealing part; a sealing roller disposition step (S20) of disposing a sealing roller on one end of a top surface of the one-side sealing part supported by the support block; a straightening block disposition step (S30) of disposing a straightening block on each of both sides of the support block, wherein the straightening block is disposed to be supported in the longitudinal direction of the one-side sealing part; a straightening roller disposition step (S40) of disposing a straightening roller on one end of a top surface of the one-side sealing part supported on the straightening block, wherein the straightening roller is disposed in a state of pressing the one-side sealing part; a straightening roller moving step (S50) of allowing the straightening roller to move from one end to the other end of the one-side sealing part so as to flatten a surface of the one-side sealing part, which is disposed between the straightening rollers; and a sealing roller moving step (S60) of allowing the sealing roller to move from one end to the other end of the one-side sealing part so as to seal the one-side sealing part supported on the support block, wherein the one-side sealing part supported on the support block is sealed in a state of being flattened by the straightening roller.

In the straightening roller disposition step (S40), the straightening rollers may be disposed so that a rotation center point of each of the pair of straightening rollers when viewed at a position that is spaced apart from the one-side sealing part in a width direction is disposed at a position spaced a set distance forward from a rotation center point of the sealing roller.

The straightening roller and the sealing roller may have the same diameter and the same rotational force.

Each of the sealing roller and the support block may have a set temperature to thermally fuse the one-side sealing part.

Advantageous Effects

The apparatus for sealing the secondary battery according to the present invention may comprise the sealing member comprising the support block and the sealing roller and the straightening member. Due to this feature, the sealing part of the pouch, on which the sealing roller passes may be flattened, to seal the sealing part without the creases or wrinkles, thereby improving the sealing quality.

In addition, in the apparatus for sealing the secondary battery according to the present invention, the support block may entirely support the sealing part from one end to the other end of the sealing part in the longitudinal direction to be in surface contact with the sealing part. Due to this feature, the sealing part may be effectively sealed from one end to the other end thereof in the longitudinal direction without the creases or wrinkles.

In addition, in the apparatus for sealing the secondary battery according to the present invention, the straightening member may comprise the straightening block and the straightening roller. Due to this feature, the sealing part of the pouch on which the sealing roller passes may be effectively flattened.

In addition, in the apparatus for sealing the secondary battery according to the present invention, the pressing groove may be formed in the top surface of the straightening block in the longitudinal direction of the one-side sealing part, and the pressing protrusion that presses the one-side sealing part disposed in the pressing groove may be formed on the circumferential surface of the straightening roller so as to be forcibly inserted into the pressing groove. Due to this feature, the one-side sealing part that is forcibly inserted into the pressing groove by the pressing protrusion may be pulled toward the straightening roller so that the surface thereof, on which the sealing roller passes, is flattened.

MODE FOR CARRYING OUT THE INVENTION

Figure 1:
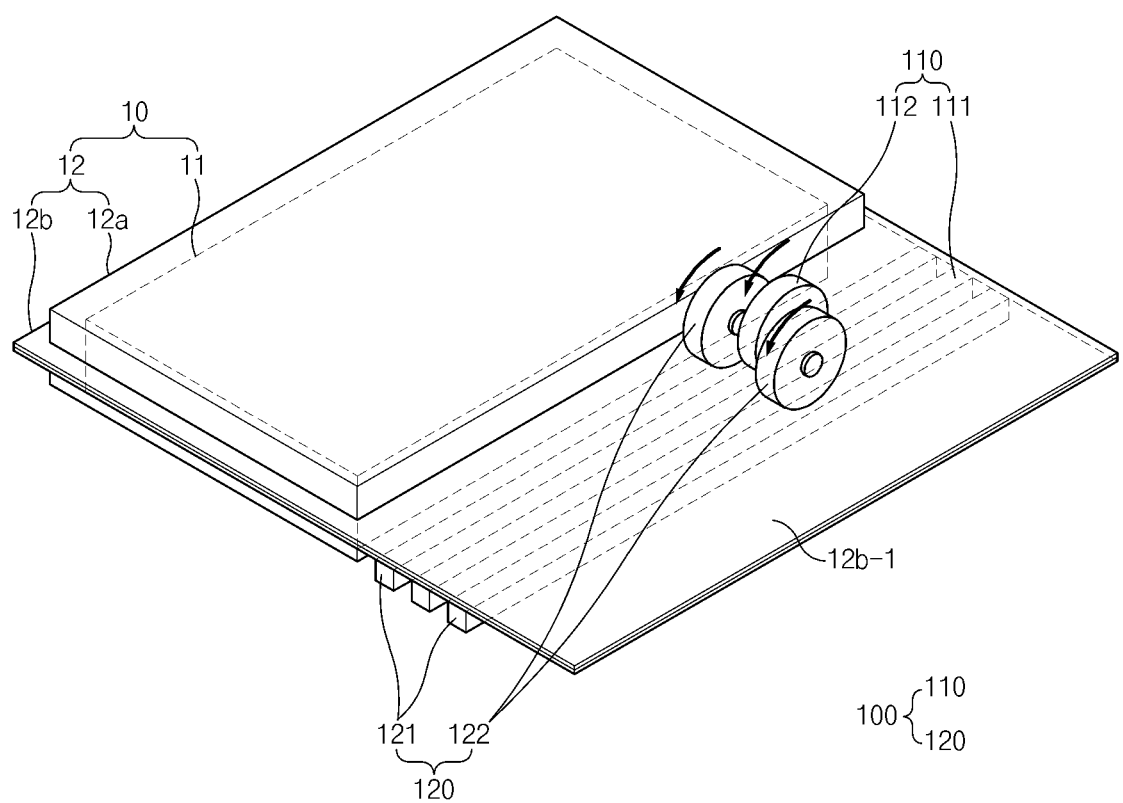
FIG. 1 is a perspective view of an apparatus for sealing a secondary battery according to a first embodiment of the present invention.
Figure 2:
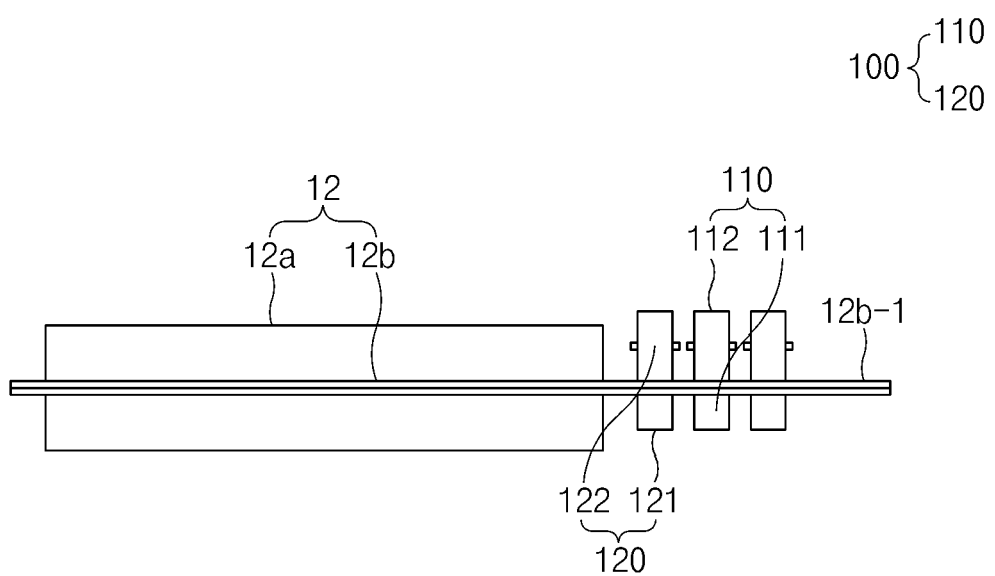
FIG. 2 is a front view of FIG. 1.
Figure 3:
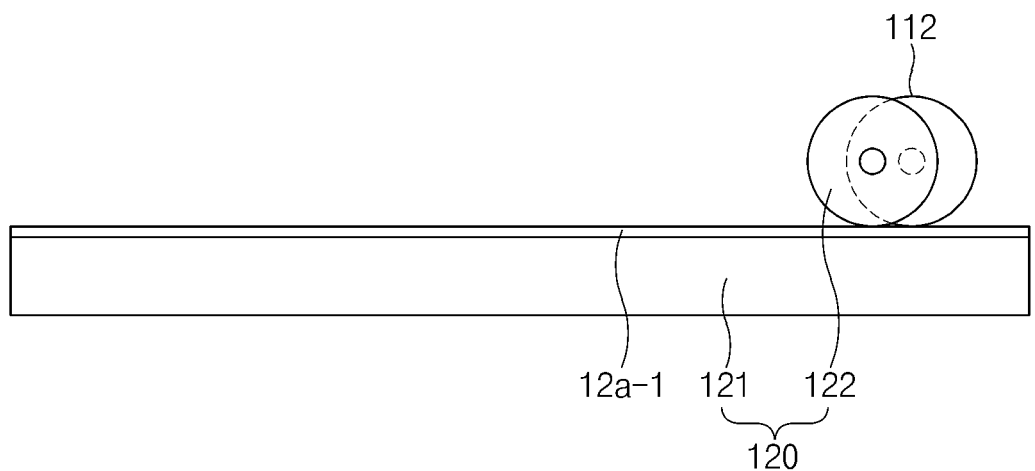
FIG. 3 is a side view of FIG. 1.
Figure 4:
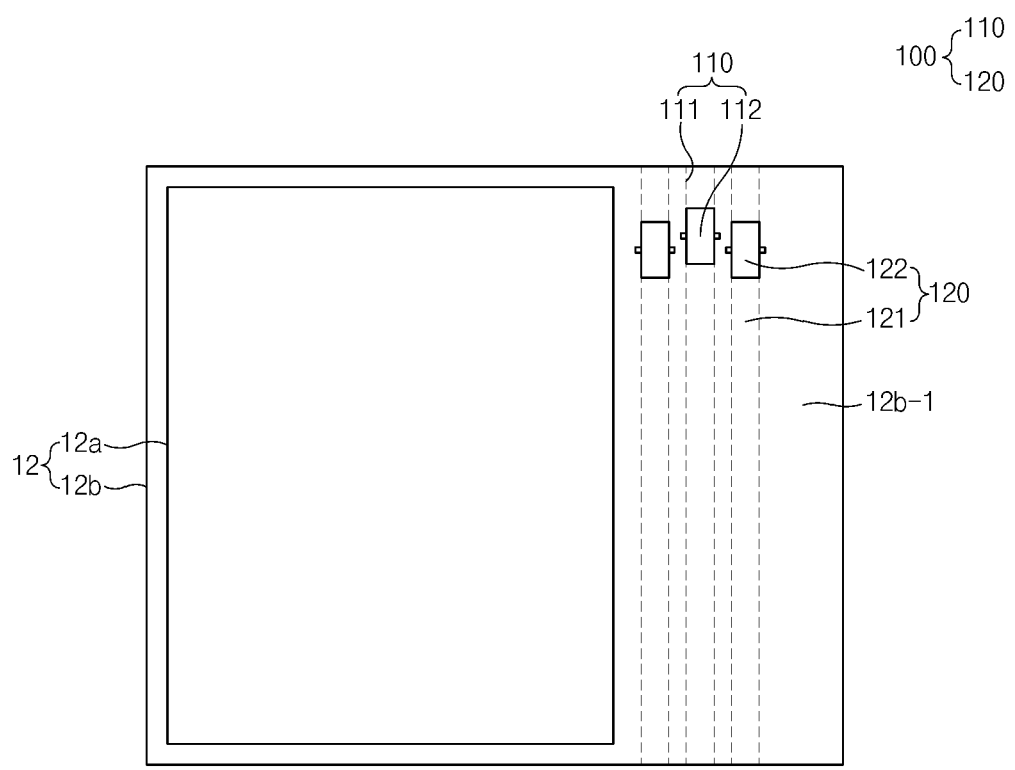
FIG. 4 is a plan view of FIG. 1.
Figure 5:
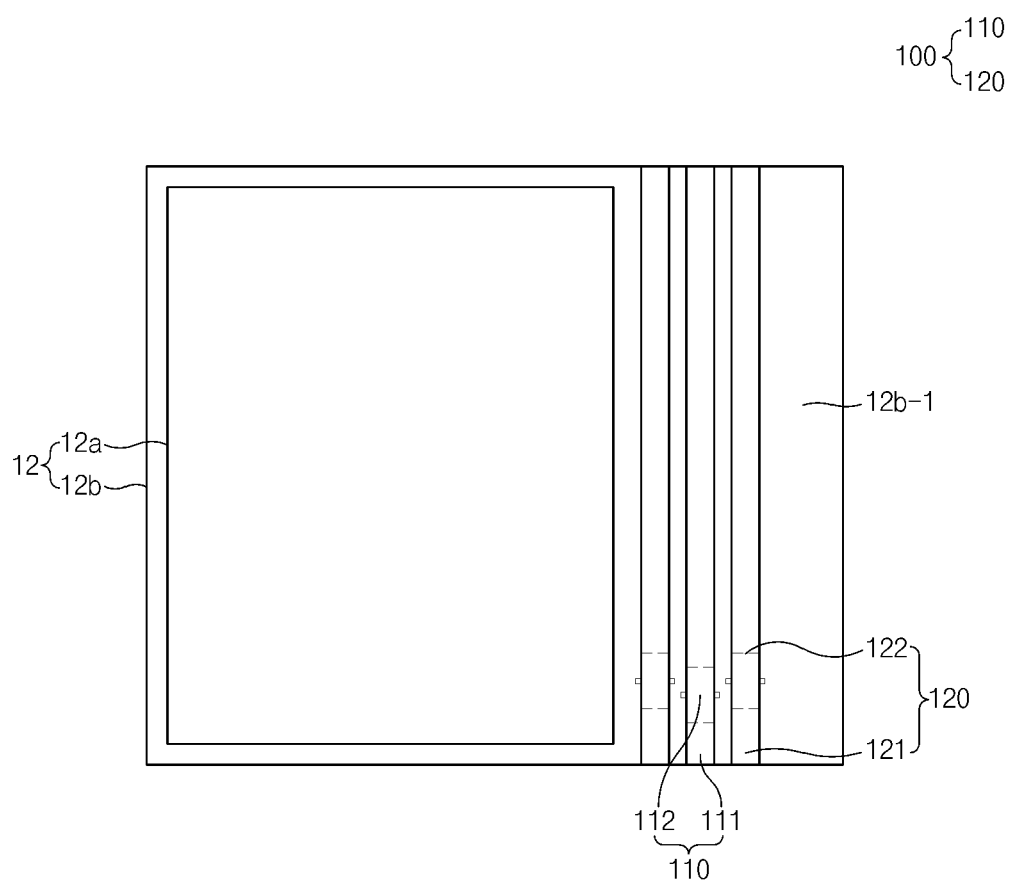
FIG. 5 is a bottom view of FIG. 1.
Figure 6:
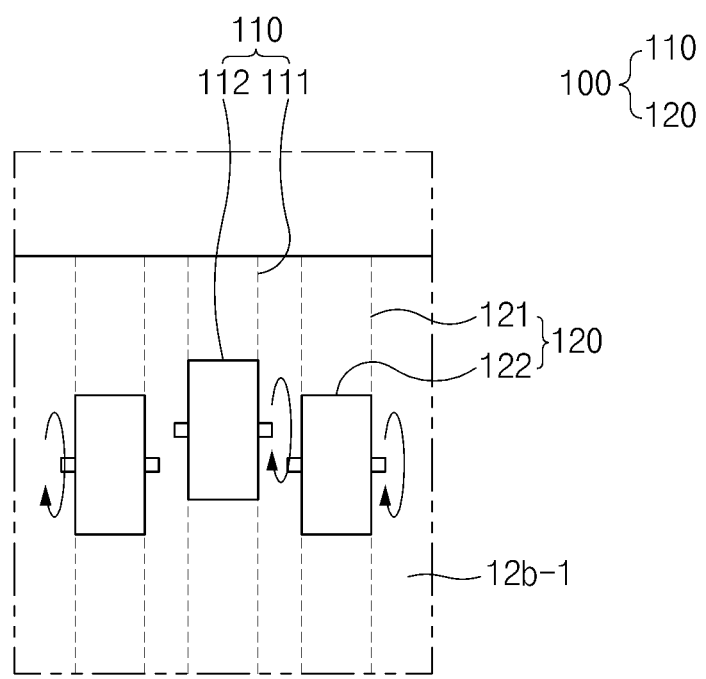
FIG. 6 is a plan view illustrating an interval between a sealing roller and a straightening roller in the apparatus for sealing the secondary battery according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment of the Present Invention]

Referring to FIG. 1, a secondary battery 10 according to a first embodiment of the present invention comprises an electrode assembly 11 and a pouch 12 accommodating the electrode assembly 11, and the pouch 12 comprises an accommodation part 12a accommodating the electrode assembly 11 and a sealing part 12b sealing the accommodation part 12a.

The secondary battery 10 according to the first embodiment of the present invention accommodates the electrode assembly 11 in the accommodation part 12a of the pouch 12, and then, the sealing part 12b of the pouch 12 is sealed. Here, an apparatus for sealing the secondary battery according to the present invention is used.

[Apparatus for Sealing Secondary Battery According to First Embodiment of the Present Invention]

As illustrated in FIGS. FIGS. 1 to 8, an apparatus 100 for sealing the secondary battery according to the first embodiment of the present invention has a structure, in which the sealing parts provided on an edge of the pouch are sequentially sealed, for example, the sealing parts are sealed to be flat without creases or wrinkles.

That is, the apparatus 100 for sealing the secondary battery according to the first embodiment of the present invention comprises a sealing member 110, which seals the sealing part (hereinafter, referred to as one-side sealing part 12*b*-1), which is disposed at one side, of the sealing parts 12*b* provided on the edge of the pouch 12 and a straightening member 120, which flattens a surface of the one-side sealing part 12*b*-1 on which the sealing member 110 passes.

Thus, the apparatus 100 for sealing the secondary battery according to the first embodiment of the present invention may seal the one-side sealing part 12*b*-1 to be flattened without the creases or wrinkles, thereby improving sealing quality of the sealing part.

Hereinafter, the configuration of the apparatus 100 for sealing the secondary battery according to the first embodiment of the present invention will be described in more detail.

Sealing Member

The sealing member 110 is configured to seal the sealing part of the pouch and comprises a support block 111 supporting a bottom surface of the one-side sealing part 12*b*-1 of the pouch 12 and a sealing roller 112 sealing the one-side sealing part 12*b*-1 supported on the support block 111.

The support block 111 has a long rectangular rod shape and is in surface contact with the one-side sealing part 12*b*-1 from one end to the other end of the one-side sealing part 12*b*-1 in a longitudinal direction of the one-side sealing part 12*b*-1 to support a bottom surface of the one-side sealing part 12*b*-1. Here, a surface of the support block 111 that supports the one-side sealing part 12*b*-1 may be formed as a horizontal surface to improve surface-contact force with the one-side sealing part 12*b*-1.

Figure 14:
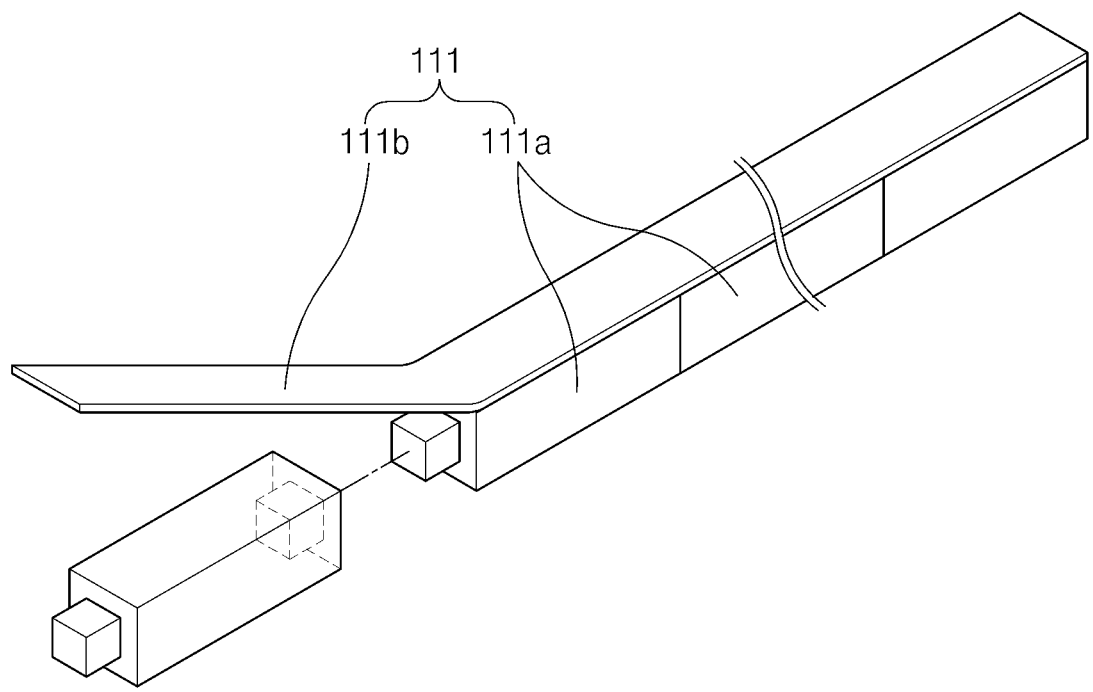
FIG. 14 is a perspective view illustrating another example of the apparatus for sealing the secondary battery according to the first embodiment of the present invention.

Particularly, referring to FIG. 14, the support block 111 may comprise a plurality of assembly blocks 111*a* that are assembled in the longitudinal direction. Thus, the support block 111 may be adjusted in length according to the number of plurality of assembly blocks connected to each other. A flat tape 111*b* for flatness may be attached to one surface of the support block 111 to which the plurality of assembly blocks 111*a* are assembled.

The sealing roller 112 moves in the longitudinal direction (from a right side to a left direction when viewed in FIG. 1) of the one-side sealing part 12*b*-1 in a state of pressing a top surface of the one-side sealing part 12*b*-1 supported on the support block 111 to seal the one-side sealing part 12*b*-1 supported on the support block 111.

Each of the support block 111 and the sealing roller 112 may have a temperature set to thermally fuse the one-side sealing part 12*b*-1, and the set temperature may be 80° C. to 150° C. Thus, the support block 111 and the sealing roller 112 may seal one-side sealing part 12*b*-1 to be sealed stably.

Here, the sealing roller 112 has a temperature greater than that of the support block 111. That is, the support block 111 may have a temperature of 80° C., and the sealing roller 112 may have a temperature of 100° C. to 150° C. When the temperature of the support block 111 is 100° C. or more, the one-side sealing part 12*b*-1 supported by the support block 111 for a long time may be deformed. Thus, the support block 111 may be set to a temperature of 80° C. to maintain a temperature at which the one-side sealing part 12*b*-1 does not rise to a temperature of 80° C. or more, and the sealing roller 112 may be only set to a high temperature to stably seal the one-side sealing part 12*b*-1 just by allowing the sealing roller 112 to pass thereon.

The sealing member 110 having the above-described configuration may stably seal the one-side sealing portion 12*b*-1 of the pouch 12.

Straightening Member

The straightening member 120 is configured to press and flatten creases or wrinkles generated on the surface of the one-side sealing part on which the sealing member passes and comprises a pair of straightening blocks 121, which are respectively provided on both sides of the support block 111 to support a bottom surface of the one-side sealing part 12*b*-1 disposed at each of both sides of the support block 111, and a pair of straightening rollers 122, which move in a longitudinal direction of the one-side sealing part 12*b*-1 in a state of pressing (or pushing) a top surface of the one-side sealing part 12*b*-1 supported by each of the straightening blocks 121 so as to be disposed between the pair of straightening blocks 121, thereby pressing and flattening the surface of the one-side sealing part 12*b*-1 on which the sealing roller 112 passes.

Figure 7:
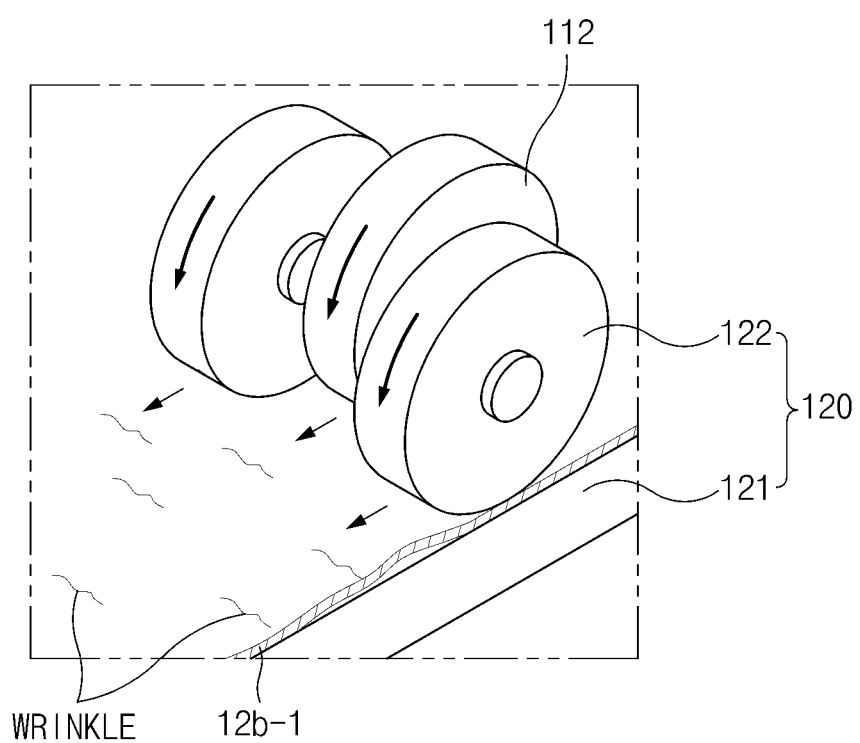
FIG. 7 is a perspective view illustrating a usage state of the apparatus for sealing the secondary battery according to the first embodiment of the present invention.
Figure 8:
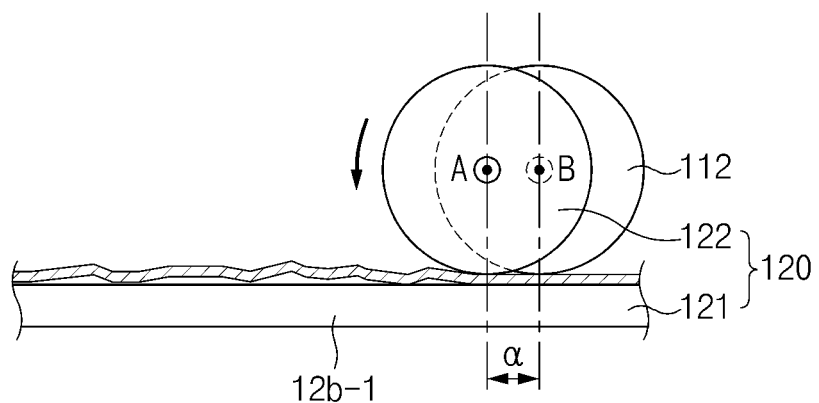
FIG. 8 is a side view illustrating the usage state of the apparatus for sealing the secondary battery according to the first embodiment of the present invention.

That is, referring to FIGS. 7 and 8, in the straightening member 120, the pair of straightening rollers 122 may move along the straightening blocks 121 while rotating to push or press the creases or wrinkles generated on the surface of the one-side sealing part 12*b*-1 in a moving direction of the straightening rollers 122 to flatten the surface of the one-side sealing part 12*b*-1 disposed between the pair of straightening rollers 122. Then, the sealing member 110 may pass on the flattened surface of the one-side sealing part 12*b*-1 to sealing the one-side sealing part 12*b*-1 without the creases or wrinkles.

A rotation center point A of each of the pair of straightening rollers 122 when viewed at a position that is spaced apart from the one-side sealing part 12*b*-1 in a width direction is disposed at a position spaced a set distance α forward from a rotation center point B of the sealing roller 122 when viewed at the other end (a left end of the sealing part when viewed in FIG. 8) of the one-side sealing part 12*b*-1. That is, the straightening roller 122 may precede the sealing roller 112 to previously flatten the surface of the one-side sealing part 12*b*-1 on which the sealing roller 112 passes, and thus, the sealing part of the pouch may be stably sealed without the creases or wrinkles.

Here, the set distance α may be 5 mm to 20 mm. That is, if the set distance α is 5 mm or less, the sealing roller 122 may pass without completely flattening the creases or wrinkles generated on the one-side sealing part 12*b*-1, and if the set distance α is 20 mm or more, the flattened surface of the one-side sealing part 12*b*-1 may be returned to its original shape to generate creases or wrinkles. Thus, the straightening roller 122 and the sealing roller 112 have a distance of 5 mm to 20 mm therebetween, and as a result, the one-side sealing part 12*b*-1 may be sealed to be flattened without the creases or wrinkles.

The pair of straightening rollers 122 and the sealing roller 112 have the same diameter and the same rotational force. That is, in order to set the pair of straightening rollers 122 and the sealing roller 112 to move at the same interval, the pair of straightening rollers 122 and the sealing roller 112 have the same diameter and the same rotational force. Thus, the pair of straightening rollers 122 and the sealing rollers 112 may easily move at the same interval.

Therefore, the apparatus 100 for sealing the secondary battery according to the first embodiment of the present invention may seal the sealing part of the pouch without the creases or wrinkles, to improve sealing quality of the sealing part, thereby reducing a defective rate.

Hereinafter, a method for sealing a secondary battery according to the first embodiment of the present invention will be described.

[Method for Sealing Secondary Battery According to First Embodiment of the Present Invention]

Figure 9:
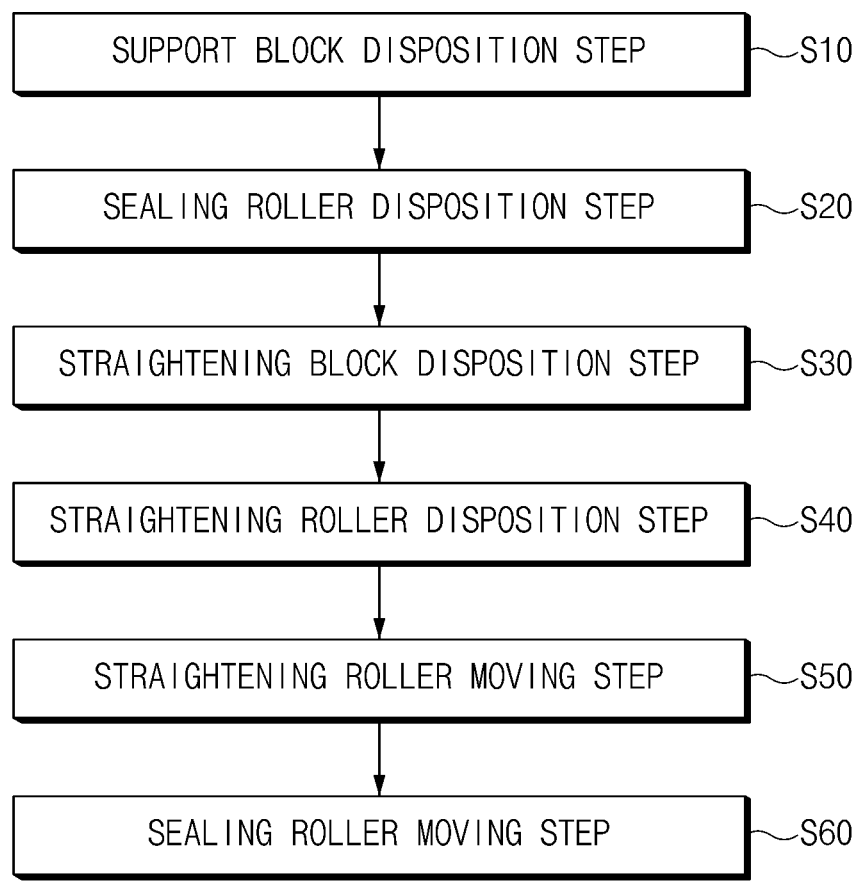
FIG. 9 is a flowchart illustrating a method for sealing the secondary battery according to the first embodiment of the present invention.

As illustrated in FIG. 9, a method for sealing a secondary battery according to the first embodiment of the present invention is a method for sealing a pouch, in which an electrode assembly is accommodated, and comprises a support block disposition step (S10), a sealing roller disposition step (S20), a straightening block disposition step (S30), a straightening roller disposition step (S40), a straightening roller moving step (S50), and a sealing roller moving step (S60).

The method for sealing the secondary battery according to the first embodiment of the present invention uses the apparatus 100 for sealing the secondary battery, and the apparatus 100 for sealing the secondary battery comprises a sealing member 110 and a straightening member 120. Also, the sealing member 110 comprises a support block 111 and a sealing block 112, and the straightening member 120 comprises a pair of straightening blocks 121 and a straightening roller 122.

Support Block Disposition Step

Referring to FIG. 1, in the support block disposition step (S10), the support block 111 is disposed on a bottom surface of one-side sealing part 12$b$-1 of a pouch 12. Here, the support block 111 is disposed to be supported in a longitudinal direction (a horizontal direction when viewed in FIG. 1) of the one-side sealing part 12$b$-1.

Sealing Roller Disposition Step

In the sealing roller disposition step (S20), the sealing roller 112 is disposed on one end (a right end of a top surface of the one-side sealing part 12$b$-1 when viewed in FIG. 1) of a top surface of the one-side sealing part 12$b$-1 supported by the support block 111.

Straightening Block Disposition Step

In the straightening block disposition step (S30), the straightening block 121 is disposed on each of both sides of the support block 111. Here, the straightening block 121 is disposed to be supported in the longitudinal direction of the one side sealing part 12$b$-1, i.e., in the same direction as the support block 111.

Straightening Roller Disposition Step

In the straightening roller arranging step (S40), the straightening roller 122 is disposed on one end of the top surface of the one-side sealing part 12$b$-1 supported by the straightening block 121. Here, the straightening roller 122 is disposed in a state of pressing the one-side sealing part 12$b$-1.

Particularly, referring to FIG. 8, in the straightening roller disposition step (S40), the straightening rollers 122 are disposed so that a rotation center point of each of the pair of straightening rollers 122 when viewed at a position that is spaced apart from the one-side sealing part 12$b$-1 in a width direction is disposed at a position spaced a set distance forward from a rotation center point of the sealing roller 122. Thus, the straightening roller 122 may move to precede the sealing roller 112, thereby pressing and flattening a surface of the one-side sealing part 12$b$-1, on which the sealing roller 112 passes.

Here, the straightening roller 122 and the sealing roller 112 have the same diameter and the same rotational force. Thus, it is possible to prevent a change in movement interval between the straightening roller 122 and the sealing roller 112 so that the straightening roller 122 and the sealing roller 112 move at the same interval. As a result, the flattened surface of the one-side sealing part 12$b$-1 may be stably sealed.

Straightening Roller Moving Step

In the straightening roller moving step (S50), the straightening roller 122 moves from one end to the other end of the one-side sealing part 12$b$-1. Then, the surface of the one-side sealing part 12$b$-1 is pressed by the straightening roller 122. Here, if there are creases or wrinkles on the surface of the one side sealing part 12$b$-1, the creases or wrinkles are flattened.

In more detail, referring to FIGS. 7 and 8, when the straightening roller 122 moves from one end to the other end of the one-side sealing part 12$b$-1 while rotating, the creases or wrinkles of the one-side sealing part 12$b$-1, which is disposed between the pair of straightening rollers 122, are pressed or pushed to be flattened.

Sealing Roller Moving Step

In the sealing roller moving step (S60), the sealing roller 112 moves from one end to the other end of the one-side sealing part 12$b$-1 to seal the one-side sealing part 12$b$-1 supported on the support block 111. Here, since the sealing roller 112 passes on the one-side sealing part 12$b$-1 that is flattened by the pair of straightening rollers 122, the one-side sealing part 12$b$-1 may be sealed without the creases or wrinkles.

Particularly, each of the sealing roller 112 and the support block 111 has a set temperature to thermally fuse the one-side sealing part 12$b$-1. Thus, the one side sealing part 12$b$-1 may be stably sealed.

Hereinafter, in descriptions of another embodiment of the present invention, constituents having the same function as the above-mentioned embodiment have been given the same reference numeral in the drawings, and thus duplicated description will be omitted.

[Apparatus for Sealing Secondary Battery According to Second Embodiment of the Present Invention]

Figure 10:
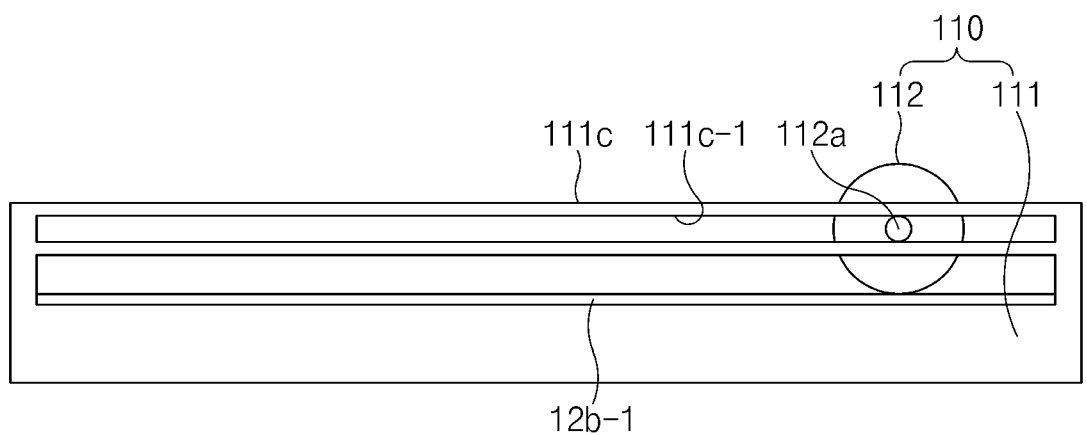
FIG. 10 is a side view of an apparatus for sealing a secondary battery according to a second embodiment of the present invention.

As illustrated in FIG. 10, an apparatus 100 for sealing a secondary battery according to a second embodiment of the present invention further comprises a guide means configured to guide a sealing roller 112 so that the sealing roller 112 moves from one end to other end of the support block 111.

That is, the guide means comprises a guide piece 111$c$ in which a guide hole 111$c$-1 is formed from one end to the other end of one surface of the support block 111 and a guide protrusion 112$a$ having one end that is freely rotatably coupled to a rotation shaft of the sealing roller 112 and the other end that is movably coupled to the guide hole 111$c$-1 to guide the sealing roller 112 from one end to the other end of the support block 111.

Thus, in the apparatus 100 for sealing the secondary battery according to the second embodiment of the present invention, the sealing roller 112 may stably move through the guide piece 111$c$ and the guide protrusion 112$c$. As a result, the one-side sealing part 12$b$-1 of a pouch may be uniformly and safely sealed.

[Apparatus for Sealing Secondary Battery According to Third Embodiment of the Present Invention]

Figure 11:
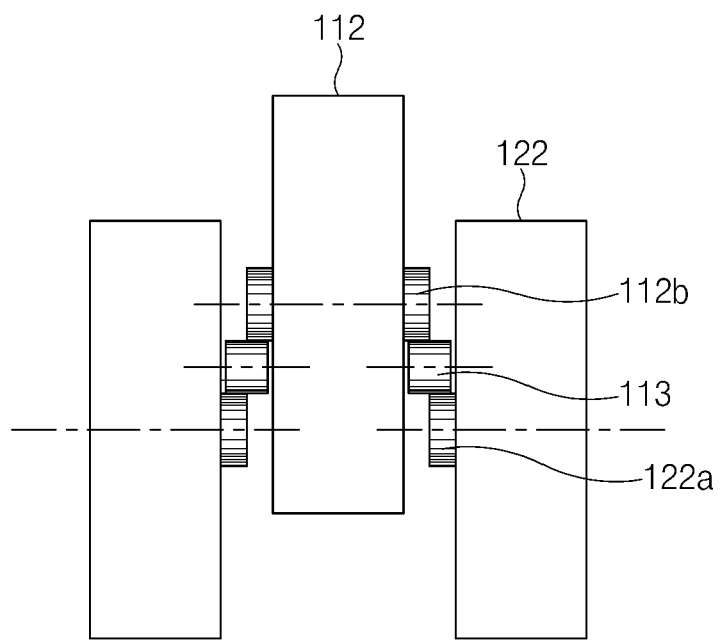
FIG. 11 is a plan view of an apparatus for sealing a secondary battery according to a third embodiment of the present invention.

As illustrated in FIG. 11, an apparatus 100 for sealing a secondary battery according to a third embodiment of the present invention comprises a pair of straightening rollers 122 and a sealing roller 112. The pair of straightening rollers 112 and the sealing roller 112 are coupled to be interlocked with each other.

That is, the apparatus 100 for sealing the secondary battery according to the third embodiment of the present invention comprises a straightening gear 122$a$ provided on a rotation shaft, a sealing gear 112$b$ provided on a rotation shaft of the sealing roller 112, and a connection gear 113 connecting the straightening gear 122$a$ to the sealing gear 112b. Here, the straightening gear 122a and the sealing gear 11b have the same gear ratio.

Therefore, in the apparatus 100 for sealing the secondary battery according to the third embodiment of the present invention, when the sealing roller 112 rotates, the straightening roller 122 is interlocked in the same direction to rotate, thereby improving operability and convenience of use and significantly simplifying a structure.

[Apparatus for Sealing Secondary Battery According to Fourth Embodiment of the Present Invention]

Figure 12:
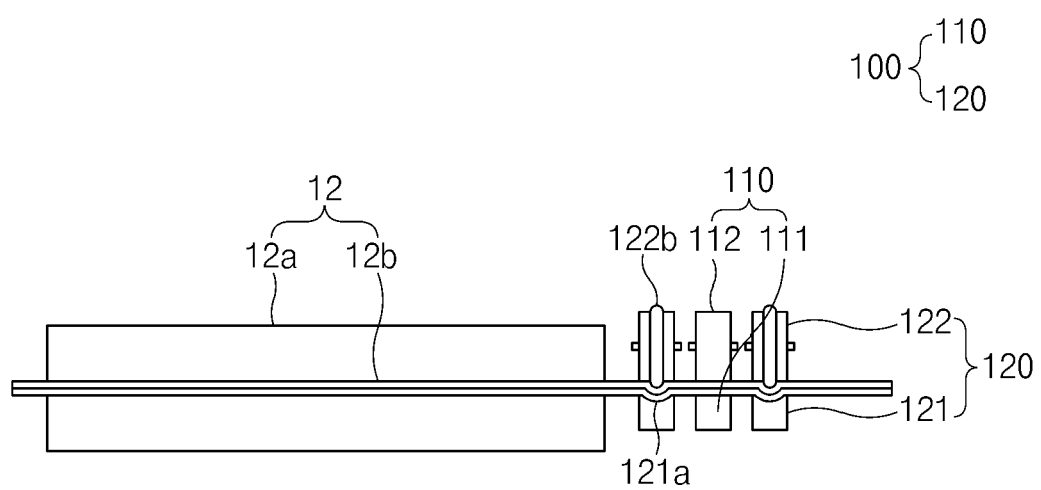
FIG. 12 is a front view of an apparatus for sealing a secondary battery according to a fourth embodiment of the present invention.
Figure 13:
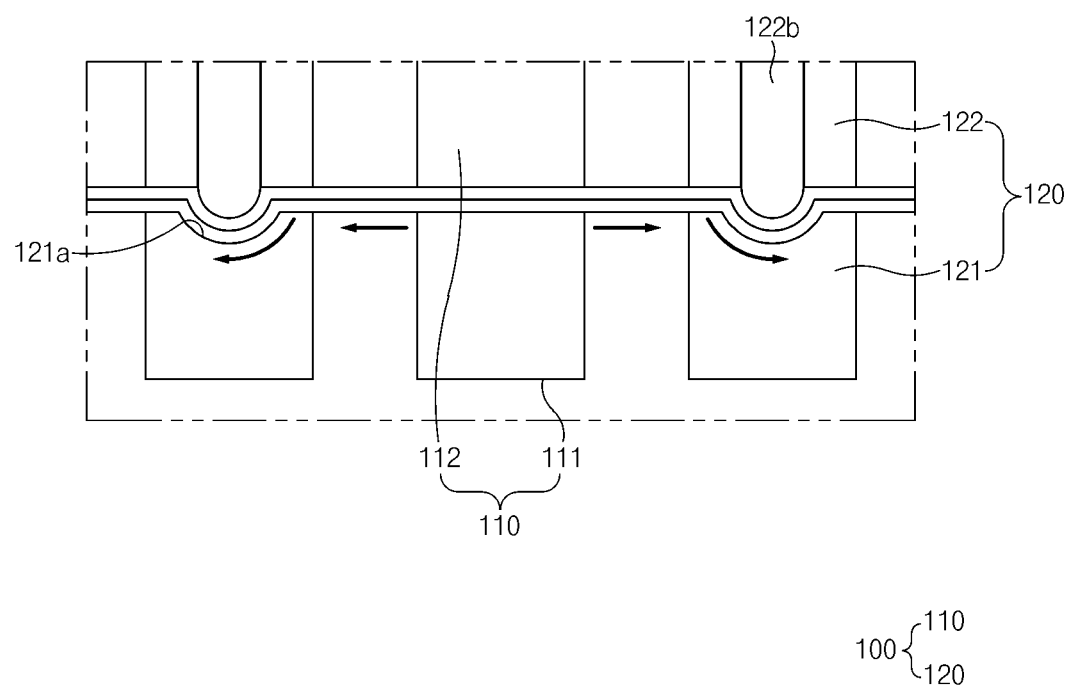
FIG. 13 is a front view illustrating a usage state of the apparatus for sealing the secondary battery according to the fourth embodiment of the present invention.

As illustrated in FIGS. 12 and 13, an apparatus 100 for sealing a secondary battery according to a fourth embodiment of the present invention comprises a straightening block 121 and a straightening roller 122. A pressing groove 121a is formed in a top surface of the straightening block 121 in a longitudinal direction of one-side sealing part 12b-1, and a pressing protrusion 122b forcibly pressing the one-side sealing part 12b-1 disposed in the pressing groove 121a to be inserted into the pressing groove 121a is formed on a circumferential surface of the straightening roller 122.

Therefore, in the apparatus 100 for sealing the secondary battery according to the fourth embodiment of the present invention, since the one-side sealing part 12b-1 is forcibly inserted into the pressing groove 121a by the pressing protrusion 122b, the one-side sealing part may be pulled in a direction of the straightening roller, and as a result, a surface of the one-side sealing part 12b-1 disposed between the pair of straightening rollers 122 may be more flattened.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Sealing apparatus
110: Sealing member
111: Support block
112: Sealing roller
120: Straightening member
121: Straightening block
122: Straightening roller

The invention claimed is:

1. An apparatus for sealing a pouch of a secondary battery, the apparatus comprising:
    a support block configured to support a bottom surface of a one-side sealing part of the pouch;
    a sealing member comprising a sealing roller that is configured to move in a longitudinal direction of the one-side sealing part in a state of pressing a top surface of the one-side sealing part supported on the support block to seal the one-side sealing part supported on the support block; and
    a straightening member configured to flatten the top surface of the one-side sealing part on which the sealing roller is configured to press, wherein the straightening member comprises:
        a pair of straightening blocks, which are respectively provided on opposite sides of the support block to support the bottom surface of the one-side sealing part disposed at the opposite sides of the support block; and
        a pair of straightening rollers which are configured to move in the longitudinal direction of the one-side sealing part in a state of pressing the top surface of the one-side sealing part supported by each of the straightening blocks while overlying the pair of straightening blocks, thereby flattening the top surface of the one-side sealing part.

2. The apparatus of claim 1, wherein the support block is configured to be in close contact with the bottom surface of the one-side sealing part from a first end to a second end in the longitudinal direction of the one-side sealing part to support the bottom surface of the one-side sealing part.

3. The apparatus of claim 1, wherein a rotation center point of each of the pair of straightening rollers is spaced a set distance forward from a rotation center point of the sealing roller in the longitudinal direction of the one-side sealing part.

4. The apparatus of claim 3, wherein the set distance ranges from 5 mm to 20 mm.

5. The apparatus of claim 1, wherein the pair of straightening rollers and the sealing roller have a same diameter and are configured to have a same rotational pressing force.

6. The apparatus of claim 5, wherein the pair of straightening rollers and the sealing roller are coupled to each other in an interlocking manner.

7. The apparatus of claim 1, wherein each straightening block has a pressing groove is formed in a top surface thereof extending in the longitudinal direction of the one-side sealing part,
    each straightening roller has a pressing protrusion extending from a circumferential surface thereof and configured to forcibly press the one-side sealing part disposed into the pressing groove, and
    the pressing protrusion is configured to forcibly insert the one-side sealing part into the pressing groove to flatten the surface of the one-side sealing part on which the sealing roller presses.

8. The apparatus of claim 1, wherein each of the sealing roller and the support block is configured to be heated to a predetermined temperature to thermally fuse the one-side sealing part.

9. The apparatus of claim 1, further comprising a guide means configured to guide the sealing roller to move from a first end to a second end of the support block only in the longitudinal direction.

10. The apparatus of claim 9, wherein the guide means comprises a guide piece in which a guide hole is formed extending from a first end to a second end of one surface of the support block and a guide protrusion having a first end that is freely rotatably coupled to a rotation shaft of the sealing roller and a second other end that is movably coupled to the guide hole to guide the sealing roller from the first end to the second end of the support block.

11. A method for sealing a pouch of a secondary battery in which an electrode assembly is accommodated using the apparatus of claim 1, the method comprising:
    a support block disposition step of disposing the support block on the bottom surface of the one-side sealing part of the pouch, wherein the support block is supported in the longitudinal direction of the one-side sealing part;
    a sealing roller disposition step of disposing the sealing roller on a first end of the top surface of the one-side sealing part supported by the support block;
    a straightening block disposition step of disposing the pair of straightening blocks on the opposite sides of the support block, wherein each straightening block is supported in the longitudinal direction of the one-side sealing part;
    a straightening roller disposition step of disposing the straightening rollers on the first end of the top surface of the one-side sealing part supported on the straightening blocks, wherein the straightening rollers is are pressing the one-side sealing part;

a straightening roller moving step of moving the straightening rollers from the first end to a second end of the one-side sealing part thereby flattening a portion of the top surface of the one-side sealing part that is disposed between the straightening rollers; and a sealing roller moving step of moving the sealing roller from the first end to the second end of the one-side sealing part thereby sealing the one-side sealing part supported on the support block, wherein the one-side sealing part supported on the support block is sealed while being flattened by the straightening roller.

12. The method of claim 11, wherein, during the straightening roller disposition step, the straightening rollers are disposed so that a rotation center point of each of the pair of straightening rollers is spaced a set distance forward from a rotation center point of the sealing roller in the longitudinal direction of the one-side sealing part.

13. The method of claim 11, wherein the straightening roller and the sealing roller have a same diameter and apply a same rotational pressing force against the one-side sealing part.

14. The method of claim 11, wherein, during the sealing roller moving step, each of the sealing roller and the support block is heated to a predetermined temperature thereby thermally fusing the one-side sealing part.

* * * * *